United States Patent
Jainek et al.

(10) Patent No.: US 6,234,194 B1
(45) Date of Patent: May 22, 2001

(54) VALVE

(75) Inventors: Herbert Jainek, Heilbronn; Jaroslav Pavlin, Freiberg, both of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/463,325

(22) PCT Filed: Jul. 2, 1998

(86) PCT No.: PCT/EP98/04083

§ 371 Date: Apr. 20, 2000

§ 102(e) Date: Apr. 20, 2000

(87) PCT Pub. No.: WO99/05438

PCT Pub. Date: Feb. 4, 1999

(30) Foreign Application Priority Data

Jul. 23, 1997 (DE) .............................. 197 31 557

(51) Int. Cl.⁷ ...................................... F16L 7/00
(52) U.S. Cl. .................. 137/375; 137/540; 137/540.13; 137/540.19
(58) Field of Search ................... 137/543.19, 543.13, 137/540, 315.33, 375

(56) References Cited

U.S. PATENT DOCUMENTS

| | | | |
|---|---|---|---|
| 1,779,503 | * 10/1930 | Swindini | 137/375 |
| 3,913,615 | * 10/1975 | Cooper | 137/543.19 |
| 3,937,250 | * 2/1976 | Golan et al. | 137/543.17 |
| 4,046,406 | * 9/1977 | Press et al. | 285/47 |
| 4,489,754 | * 12/1984 | Seessle et al. | 137/528 |
| 4,553,562 | * 11/1985 | Nakada | 137/375 |
| 4,667,697 | * 5/1987 | Crawford | 137/543.17 |
| 4,815,493 | * 3/1989 | Miller et al. | 137/454.5 |
| 4,827,968 | * 5/1989 | Brown | 137/270 |
| 4,862,913 | * 9/1989 | Wildfang | 137/543 |
| 5,193,579 | * 3/1993 | Bauer et al. | 137/540 |
| 5,271,429 | * 12/1993 | Bauer et al. | 137/543.23 |
| 5,353,834 | * 10/1994 | Schmitt et al. | 137/539.5 |
| 5,546,981 | * 8/1996 | Li et al. | 137/493.3 |
| 5,692,539 | * 12/1997 | Pickl Jr. | 137/543.19 |
| 5,794,657 | * 8/1998 | Oberg | 137/543.19 |
| 6,019,125 | * 2/2000 | Reverberi | 137/454.6 |
| 6,089,262 | * 7/2000 | Hart | 137/543.21 |

* cited by examiner

*Primary Examiner*—A. Michael Chambers
*Assistant Examiner*—Thomas L. McShane
(74) *Attorney, Agent, or Firm*—Evenson, McKeown, Edwards & Lenahan, P.L.L.C.

(57) ABSTRACT

A valve (1, 8, 14) having a valve body (2) that is pressed against a valve seat (5, 11) by the pressure of a valve spring (3) supported against a valve cap (4, 10). The valve is held together in the area of the valve seat (5, 11) by an enclosure member (7, 9, 15) coated with an elastomer, and the enclosure member (9, 15) can also form the valve plate or seat.

9 Claims, 1 Drawing Sheet

VALVE

BACKGROUND OF THE INVENTION

The invention relates to a valve in which a valve body is urged against a valve seat under the force of a valve spring which in turn is supported against a valve cap.

In known valves the valve bodies, which as a rule are spherically configured in the area of the valve seat, are urged against a correspondingly conically shaped valve plate. The production of a long-lasting tight valve seat thereby requires a large manufacturing effort.

SUMMARY OF THE INVENTION

It is the object of the invention to further develop a valve of the kind described above such that a well-sealed installation and long-lasting good sealing effect at the valve seat can be achieved in a simple manner.

The valve according to the invention has, in an advantageous manner, in a valve body which is urged against a valve seat under the pressure of a valve spring in contact with a valve cap, an enclosure member for the valve plate, which is coated with an elastomer. In a preferred embodiment, the valve seat itself also is formed by the elastomer-coated enclosure, and a separate valve plate is omitted.

In a simple manner, the valve plate can thereby be stamped out from a piece of sheet metal previously coated with the elastomer and having the necessary material thickness. In order to form a complete valve housing, the valve plate is preferably held on the valve cap by folds in such a way that the valve body lies in contact with the valve seat under a bias. Thus only a few working operations are required in order to produce a complete, functional valve. The elastomer on the valve plate is sufficiently resilient to assure a long-lasting good seal against the valve seat and to compensate for slight manufacturing tolerances.

BRIEF DESCRIPTION OF THE DRAWINGS

Working embodiments of the valve according to the invention are explained with reference to the drawing, wherein.

DETAILED DESCRIPTION OF PREFERRED EMBODIMENTS

Figure 1:
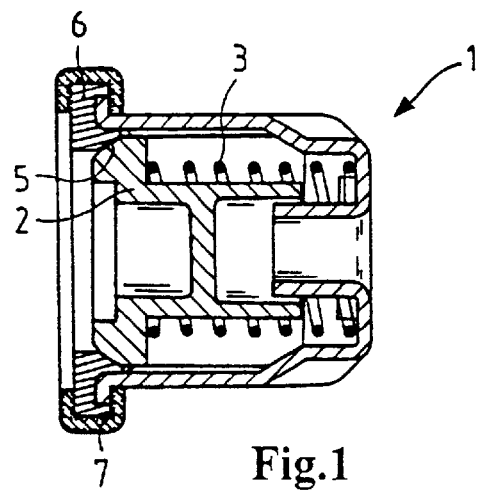
FIG. 1 shows a first working embodiment of a valve with an elastomer-coated enclosure member.

In FIG. 1 there is shown a working embodiment of a valve 1 with a valve body 2, which is urged against a valve cap 4 by a valve spring 3 and can slide in this valve cap through the necessary stroke of the valve spring.

The valve body 2 is spherically configured so as to form a valve seat 5 and here lies in sealing contact with a corresponding surface of a valve plate 6 in the closed state. The valve plate 6 is attached to the valve cap 4 by a crimped enclosure member 7, whereby when the enclosure member 7 is affixed, the valve spring 3 is compressed by a given amount. The enclosure member 7 is a stamped sheet metal part coated with elastomer inside and out, whereby a good and long-lasting seal against the housing can be achieved, especially when the valve 1 is installed in a synthetic resin housing.

In its rest position, the valve 1 thus has a closed valve seat 5 due to the force of the valve spring 3. Upon an increase in the pressure of a liquid acting on the valve body 2 in the area of the valve seat 6, the valve body 2 is urged against the force of the valve spring 3 and thus opens the valve seat 5 free for it to flow through.

Figure 2:
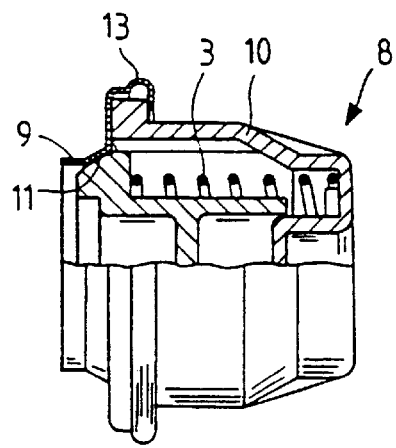
FIG. 2 shows a second working embodiment with an additional elastomer-coated valve seat.

In a departure from FIG. 1, an embodiment of the valve 8 in FIG. 2 has a relatively thin enclosure member 9 which is likewise stamped out from a sheet metal piece that is coated inside and outside with an elastomer. Analogous to member 7 in FIG. 1, the enclosure member 9 is fastened to a valve cap 10 by folds, and simultaneously forms the valve plate. Thus, the valve 8 is fully functional as soon as the valve cap 10 is attached. On the inside the elastomer coating produces a better seal against the valve seat 11, and on the outside a better seal to the housing after assembly.

An additional sealing effect between the valve 8 and a housing can be achieved in the embodiment according to FIG. 2 by a circumferential crimp 13. Especially in synthetic resin housings, the fit of the valve to the housing loosens due to thermal expansion, so that here the flexural action of the crimp 13 can provide equalization.

Figure 3:
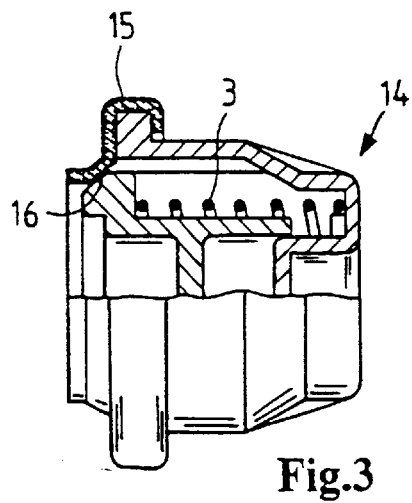
FIG. 3 shows a third working embodiment slightly modified in comparison with the embodiment of FIG. 3.

In a third embodiment of the valve 14 according to FIG. 3, an enclosure member piece 15 coated on both sides with an elastomer, but in this case having a greater thickness, is used in the same manner as in FIG. 2. Here the necessary flexural action relative to the housing after installation can be achieved by a greater coating thickness, so that otherwise required O-rings are unnecessary.

Reference Numeral List

1 = Valve
2 = Valve body
3 = Valve spring
4 = Valve cap
5 = Valve seat
6 = Valve plate
7 = Enclosure part
8 = Valve
9 = Enclosure part (Valve plate)
10 = Valve cap
11 = Valve seat
12 = Valve
13 = Circumferential crimp
14 = Valve
15 = Enclosure part (Valve plate)

What is claimed is:

1. A valve comprising a valve body, a valve seat, a valve spring arranged to urge said valve body against said valve seat, a valve cap supporting said valve spring, and an elastomer-coated enclosure member which secures said valve together, wherein the elastomer-coated enclosure member is folded over said valve cap.

2. A valve according to claim 1, wherein said valve seat is formed by a surface of said elastomer-coated enclosure member.

3. A valve according to claim 1, wherein said elastomer-coated enclosure member is a stamping of a piece of elastomer-coated sheet metal.

4. A valve according to claim 1, wherein the elastomer-coated enclosure member is secured by folds therein to the valve cap.

5. A valve according to claim 1, wherein said valve spring is compressed between said valve body and said valve cap such that the valve body is resiliently biased against said valve seat to form a normally closed valve.

6. A valve according to claim 1, wherein the elastomer-coated enclosure member is provided with a resilient, outer circumferential crimp which gives the member a radial sealing effect.

7. A valve consisting of a valve body, a valve spring, a valve cap supporting said valve spring and an elastomer-coated enclosure member which secures said valve together, wherein said valve spring is arranged to urge said valve body against said elastomer-coated enclosure member.

8. A valve comprising a valve body, a valve seat, a valve spring arranged to urge said valve body against said valve seat, a valve cap supporting said valve spring, and an elastomer-coated enclosure member which secures said valve cap by folds, and a surface of said elastomer-coated enclosure member forms said valve seat.

9. A valve according to claim 7, wherein the elastomer-coated enclosure member is provided with a resilient, outer circumferential crimp which gives the member a radial sealing effect.

* * * * *